(12) United States Patent
Chern

(10) Patent No.: US 6,226,136 B1
(45) Date of Patent: May 1, 2001

(54) SYSTEM AND METHOD FOR GAIN COMPENSATION FOR THERMAL ASPERITY CORRECTION

(75) Inventor: Jenn-Gang Chern, Redwood Shores, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/164,864

(22) Filed: Oct. 1, 1998

(51) Int. Cl.[7] ........................................... G11B 5/02
(52) U.S. Cl. ................................. 360/25; 360/67
(58) Field of Search .................... 360/25, 46, 67

(56) References Cited

U.S. PATENT DOCUMENTS

| | | | |
|---|---|---|---|
| 5,233,482 | 8/1993 | Galbraith et al. | 360/46 |
| 5,847,890 | * 12/1998 | Hattori | 360/67 |
| 6,005,726 | * 12/1999 | Tsunoda | 360/25 |

FOREIGN PATENT DOCUMENTS 10-143804 * 5/1998 (JP) .

WO 99/18575   4/1999 (WO) .

OTHER PUBLICATIONS

Cideciyan, Roy D.; Dolivo, Francois; Hermann, Reto; Hirt, Walter, "A PRML System for Digital Magnetic Recording", Jan. 1, 1992, IEEE Journal on Selected Areas in Communications, pp. 38–56.

* cited by examiner

*Primary Examiner*—W. Chris Kim

(57) ABSTRACT

A system and method are disclosed for reading data from a magnetic disk. The method includes generating a preamplified data signal by reading the magnetic state of the disk using a magnetoresistive head. The preamplified data signal is capacitively coupled to a variable gain read channel amplifier. The variable gain read channel amplifier has an input, an output, and a programmable gain. The input of the variable gain read channel amplifier has a variable gain read channel amplifier input resistance. The occurrence of a thermal asperity event is detected and an adjustment is made to the variable gain read channel amplifier input resistance to compensate for the thermal asperity event. An adjustment to the programmable gain of the variable gain read channel amplifier is made to compensate for the adjustment to the variable gain read channel amplifier input resistance.

15 Claims, 4 Drawing Sheets

SYSTEM AND METHOD FOR GAIN COMPENSATION FOR THERMAL ASPERITY CORRECTION

BACKGROUND OF THE INVENTION

1. Field of the Invention

The present invention relates generally to improving the performance of magnetic storage media reading devices. More specifically, the invention relates to gain compensation for thermal asperity correction. In particular, the invention relates to a method of adding a gain compensation factor to a variable gain amplifier that compensates for a lowered input resistance at the input of the variable gain amplifier where the decreased input resistance to the variable gain amplifier was introduced for the purpose of correcting for a thermal asperity event.

2. Relationship to the Art

In the modem disk drives that employ magnetoresistive (MR) recording heads, one common problem that leads to errors or unreadable data is so called "thermal asperity" (thermal asperity) effects. A magnetoresistive head is a device which has a variable resistance in the presence of a variable magnetic field. Thermal asperity effects are caused by media defects or particulate impacting the MR head. Such impacts generate heat which can cause the MR head resistance to change. Changes in the MR head resistance caused by thermal events caused by impacts can either wash out a read signal or can appear to be an intended variation in a read signal. Thus, thermal asperity effects can impair the signal read from the disk and can cause errors during read back.

Because the effect of a thermal asperity event is similar to a low frequency baseline DC shift superimposed on the original signal, one method of compensating for such events is to attempt to remove the DC shift when a thermal asperity event is detected. This may be accomplished by lowering the input resistance of an amplifier that amplifies the signal from the MR head as is described below.

FIG. 1 is a block diagram illustrating a typical read channel for a magnetic disk reader that uses a magnetoresistive head. A disk 100 is read using a magnetoresistive head 102. By passing a constant current through the variable resistance and measuring the voltage across the variable resistance, it is possible to determine the state of the magnetic field in the region of the disk being read. The voltage output from the magnetoresistive head 102 is input into a preamplifier 104. Preamplifier 104 outputs a differential signal that is coupled to a read channel amplifier 106 using a pair of coupling capacitors 108. The interface between the preamplifier and the read channel amplifier is shown in greater detail in FIG. 2.

FIG. 2 is a block diagram illustrating the circuit which couples a preamplifier 210 to a read channel amplifier circuit 220. Typically, read channel amplifier circuit 220 includes a variable gain amplifier. The variable gain amplifier adjusts the incoming signal magnitude to realize the best signal quality. Typically, that is done in the digital domain. Vs represents the preamplifier signal that is obtained by reading the MR head, "Rs" is the output resistance of the preamplifier, which is represented by a pair of internal output resistors 212. A pair of coupling capacitors 214 couple the signal from the preamplifier to the read channel amplifier circuit 220 on a line 222 and a line 224. The coupling capacitance is chosen to be large enough so that the lowest frequency of interest may be passed without much attenuation.

The input resistance of the read channel amplifier "Rin" is represented by internal input resistor 240. The signal that is input to the read channel amplifier is roughly proportional to Rin/(Rs+Rin). Typically the Rin is much larger than Rs, so that most of the signal from the preamplifier is delivered to the read channel amplifier with very little loss.

Because the read channel amplifier circuit 220 is coupled to the preamplifier chip through capacitors 214, the DC difference between the two chips is stored on the coupling capacitors. When a thermal asperity event happens, the coupling capacitors are charged up due to the DC baseline shift. To restore the DC quickly, differential input resistance 240 on the read channel amplifier side may be lowered to reduce the input time constant and quickly discharge the coupling capacitors to the correct DC levels. One problem associated with the lowering the input resistance in this manner during a thermal asperity event is that lowering the input resistance to the read channel amplifier causes the signal to be attenuated at the same time, which causes the overall gain of the read channel to change. Thus, even though the DC can be quickly restored, the signal is distorted due to lowered input resistance.

The input resistance of variable gain amplifier 260 may be lowered by simply adding a shunt resistor 242 between line 222 and 224. As noted above, this reduces the charging and discharging time of Cin and also reduces the input resistance of variable gain amplifier 260, which reduces the signal input to the read channel amplifier. It should be noted that this effect generally is not compensated for digitally by the variable gain amplifier because the VGA gain is actually frozen during a thermal asperity event. The VGA is frozen because the incoming signal is being disturbed too much at the time for gain loop updates to be performed.

What is needed is a way of compensating for the decreased signal gain in the read channel that is caused by lowering the input resistance of the read channel amplifier.

SUMMARY OF THE INVENTION

Accordingly, the present invention provides a gain compensation scheme that restores the gain of the read channel chip during a thermal asperity event. The thermal asperity event is detected and the input resistance of the read channel amplifier is reduced to quickly discharge the coupling capacitors to the correct DC levels. At the same time, the gain of the read channel amplifier is increased by an amount that compensates for the attenuation caused by the lowered read channel amplifier input resistance. As a result, the signal distortion due to lowered input resistance is reduced and the chip performance is enhanced.

It should be appreciated that the present invention can be implemented in numerous ways, including as a process, an apparatus, a system, a device, a method, or a computer readable medium. Several inventive embodiments of the present invention are described below.

In one embodiment, A method of reading data from a magnetic disk is disclosed. The method includes generating a preamplified data signal by reading the magnetic state of the disk using a magnetoresistive head. The preamplified data signal is capacitively coupled to a variable gain read channel amplifier. The variable gain read channel amplifier has an input, an output, and a programmable gain. The input of the variable gain read channel amplifier has a variable gain read channel amplifier input resistance. The occurrence of a thermal asperity event is detected and an adjustment is made to the variable gain read channel amplifier input resistance to compensate for the thermal asperity event. An adjustment to the programmable gain of the variable gain read channel amplifier is made to compensate for the adjustment to the variable gain read channel amplifier input resistance.

In another embodiment, a method of adjusting the gain of a variable gain read channel amplifier having an input, an output and a programmable gain upon the occurrence of a thermal asperity event is disclosed. The method includes detecting a thermal asperity event and changing the resistance across the inputs of the variable gain read channel amplifier to allow energy generated by the thermal asperity event to dissipate. The change in the resistance across the inputs of the variable gain read channel amplifier causes an attenuation in the output of the variable gain read channel amplifier. A thermal asperity gain adjustment signal is generated for the variable gain read channel amplifier. The gain adjustment signal corresponds to a change in gain of the variable gain read channel amplifier that substantially cancels out the attenuation in the output of the variable gain read channel amplifier. The programmable gain of the variable gain read channel amplifier is changed using the thermal asperity gain adjustment signal.

In another embodiment, a system for reading data from a magnetic disk is disclosed. The system includes a magnetoresistive recording head. A preamplifier circuit generates a sense signal from the magnetoresistive recording head. A variable gain read channel amplifier is connected to the preamplifier circuit by a capacitive coupling circuit. A thermal asperity event detector detects thermal asperity events and sends a gain adjustment signal to the variable gain read channel amplifier upon the occurrence of such an event.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

Reference will now be made in detail to the preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

When a thermal asperity event is detected, the input resistance of the read channel amplifier is reduced to quickly discharge the coupling capacitors that couple the read channel amplifier to the preamplifier signal from the MR head. The detection of that thermal asperity event also triggers a correction to the gain of the read channel amplifier that compensates for the attenuation of the output of the read channel amplifier that is caused by the lowered read channel amplifier input resistance.

Figure 1:
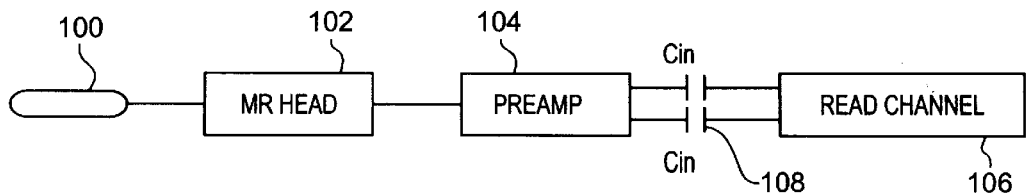
FIG. 1 is a block diagram illustrating a typical read channel for a magnetic disk reader that uses a magnetoresistive head.
Figure 2:
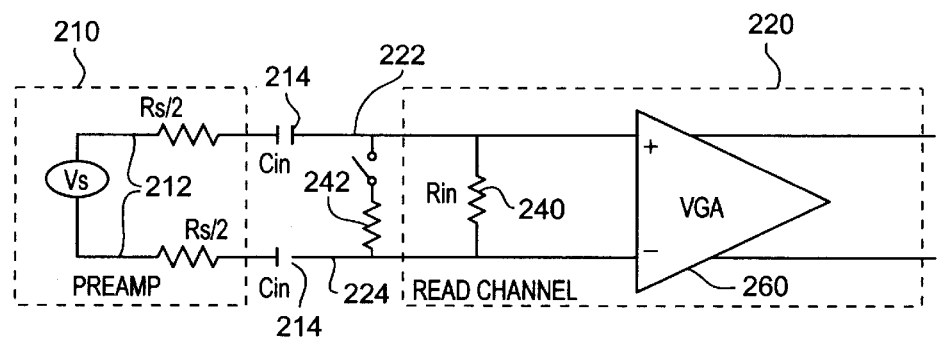
FIG. 2 is a block diagram illustrating the circuit which couples a preamplifier to a read channel amplifier circuit.
Figure 3A:
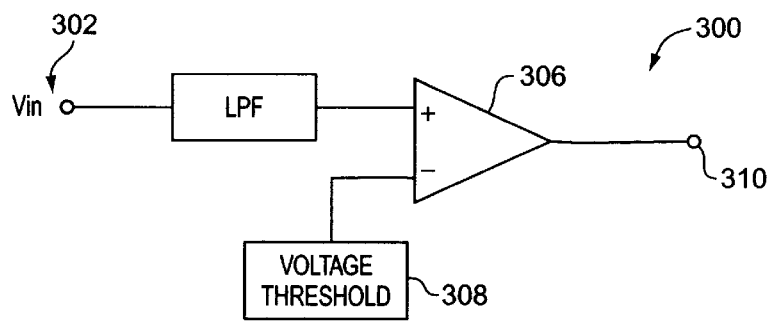
FIG. 3A is a block diagram illustrating a thermal asperity event detector used to detect thermal asperity events.

FIG. 3A is a block diagram illustrating a thermal asperity event detector 300 used to detect thermal asperity events. Thermal asperity event detector 300 may detect thermal asperity events by sensing a signal at its input from either the preamplifier or the read channel amplifier. Thermal asperity event detector 300 includes an input voltage node 302 that is connected to a low pass filter 304. The output of low pass filter 304 is input to a comparator 306. A voltage threshold 308 is also input to comparator 306. The output of comparator 306 is taken at node 310 and is high when the output of low pass filter 304 exceeds the input voltage threshold 308. This circuit is effective to determine when a thermal asperity event occurs because the low pass filter filters out the variations in the signal due to actual data but passes the low frequency thermal asperity perturbations in the signal that causes a large voltage gain. In the embodiment shown, a single voltage threshold is input to the comparator. In other embodiments, a variable voltage threshold may be input to the comparator so that the threshold at which thermal asperity events are detected may be varied.

In another embodiment, the output of low pass filter 304 is fed to several comparators each having a different voltage threshold. The output of the comparators is used to select one of a plurality of possible changed input resistances to the read channel variable gain amplifier. Also, a single comparator could be used with a variable comparison voltage applied to the second input of the comparator. Thus, the magnitude of the thermal asperity event determines how much the input resistance to the variable gain amplifier is reduced. In this manner, the discharge time of the coupling capacitors is reduced by an appropriate amount.

Figure 3B:
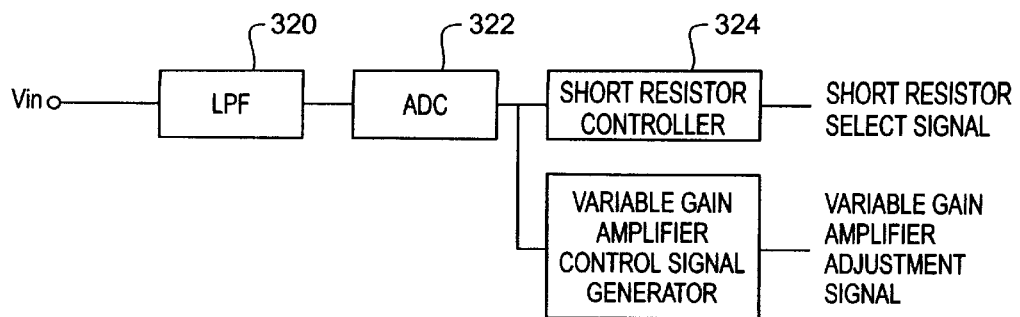
FIG. 3B is block diagram illustrating a thermal asperity event detector that detects different levels of thermal asperity events and outputs a control signal for a variable shunt resistor and a control signal for a variable gain amplifier.

FIG. 3B is block diagram illustrating a thermal asperity event detector that detects different levels of thermal asperity events and outputs a control signal for a variable shunt resistor and a control signal for a variable gain amplifier. The output voltage of the preamplifier is input to a low pass filter 320. The output of low pass filter 320 is input to an analog-to-digital converter 322. In one embodiment, analog-to-digital converter 322 has a resolution of three bits, enabling the thermal asperity detector to detect eight different levels of thermal asperity events. It should be noted that in certain embodiments, ADC 322 may be replaced by a device that generates a selected analog voltage output level based on the measured level of thermal asperity events. The output of ADC 322 is input to a shunt resistor controller 324 and a variable gain amplifier control signal generator 326.

Shunt resistor controller 324 provides a control signal to a variable shunt resistor that changes the input resistance of the variable gain amplifier. In one embodiment, the variable shunt resistor is simply a network of resistors and the output of shunt resistor controller 324 selectively connects shunt resistors in the network. In other embodiments, other methods of varying the input resistance to the variable gain amplifier may be used. Variable gain amplifier control signal generator 326 generates a signal used to adjust the gain of the variable gain amplifier. In the embodiment where the thermal asperity event detector detects eight levels of thermal asperity events, variable gain amplifier control signal generator 326 generates one of eight amplifier adjustment signals that correspond to the change in input resistance specified by the shunt resistor controller. As is described below, the variable gain amplifier adjustment signal may be either a digital signal or an analog signal that is combined with a feedback gain signal derived from the output of the read channel.

Figure 4:
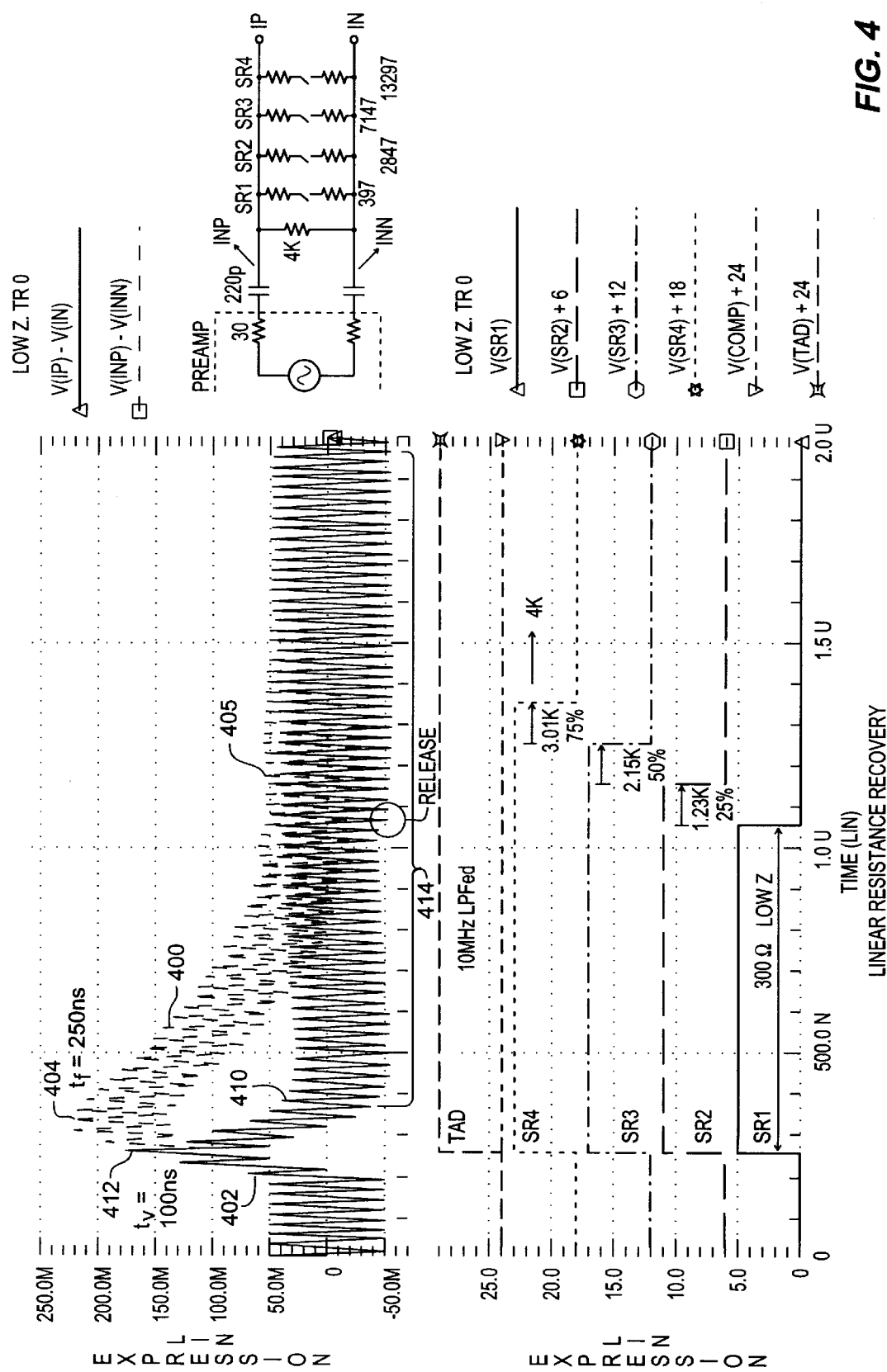
FIG. 4 is a graph illustrating a signal produced by a thermal asperity event and how the voltage of the signal may be brought back into the operating band of the system by reducing the input resistance of the variable gain amplifier.

FIG. 4 is a graph illustrating a signal produced by a thermal asperity event and how the voltage of the signal may be brought back into the operating band of the system by reducing the input resistance of the variable gain amplifier. A signal 400 is shown that was recorded without any thermal asperity correction. A thermal asperity event happens at point 402 and the signal rises quickly to a peak at a point 404 and then slowly decays and remains above the amplitude limit of a normal read signal until about a point 405. While the signal is above a threshold that is generally set at close to the maximum signal level of a normal read signal, the read channel is unable to obtain data from the signal. Any data in the signal is completely washed out by the thermal asperity event.

A signal 410 represents a signal generated by a thermal asperity event that is corrected by decreasing the input resistance to the variable gain amplifier in the read channel. When a thermal asperity event occurs at point 402, the signal rises quickly but only rises to a peak at point 412 and then decays quickly back into the range of acceptable output from the preamplifier. As a result, data may be recovered from more of the signal. However, the distortion of the signal can be seen from the fact that the signal in region 414 has a lower amplitude than the signal 400 which was not produced with a thermal asperity correction. This distortion in signal 410 is undesirable and may cause data to be misread.

Figure 5:
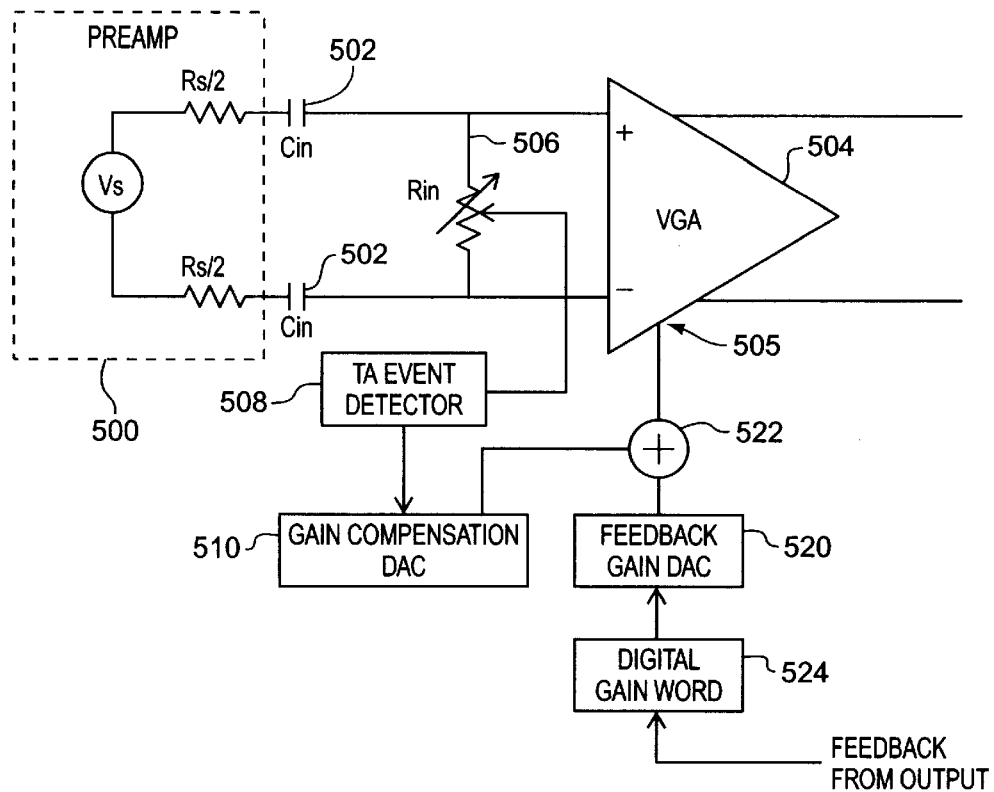
FIG. 5 is a block diagram illustrating a gain compensation circuit that adjusts the gain to the read channel amplifier when a thermal asperity event is detected and the input resistance to read channel amplifier is lowered to compensate for a the thermal asperity event.

FIG. 5 is a block diagram illustrating a gain compensation circuit that adjusts the gain to the read channel amplifier when a thermal asperity event is detected and the input resistance to read channel amplifier is lowered to compensate for a the thermal asperity event. A preamplifier 500 has input resistance Rs and is coupled to a variable gain amplifier 504 through a pair of coupling capacitors 502. The input resistance to the variable gain amplifier is varied by changing the resistance of a variable shunt resistor 506. As described above, the purpose of varying the input resistance of the variable gain amplifier 504 is to compensate for thermal asperity events. A thermal asperity event detector 508 detects thermal asperity events and sends a signal to variable shunt resistor 506.

As noted above, thermal asperity event detector 508 may detect several levels of thermal asperity events depending on the magnitude of the voltage increases caused in the input signal to the read channel amplifier by a thermal asperity event. In one embodiment, eight levels of thermal asperity events are detected and eight separate input shunt resistances are selected by the thermal asperity event detector based on the level of thermal asperity event detected. In other embodiments, more resolution may be provided. In one embodiment, only one level of thermal asperity event is detected and only one input shunt resistance is used. However, the threshold of the thermal asperity event detector may be selected by the user and a single shunt resistance used upon the detection of a thermal asperity event may be selected to correspond to a detection level specified or may be independently selected.

In addition to controlling the variable shunt resistor, thermal asperity event detector 508 also sends a signal to a gain compensation DAC 510. Gain compensation DAC 510 outputs an analog signal that changes the gain of the variable gain amplifier 504 by an amount that corresponds to the gain change due to the input shunt resistance 506 for the thermal asperity event detected. In one embodiment, the output of gain compensation DAC is selected based on the level of thermal asperity event detected by a multibit resolution thermal asperity event detector. In another embodiment, a single amount of gain compensation is preselected to correspond to an associated preselected change in input resistance.

In one embodiment, gain compensation DAC is a three bit DAC. The gain of the variable gain amplifier is increased by from 0 to 2.1 dB in 0.3 dB increments corresponding to a preselected gain adjustment. Alternatively, the gain increase may be determined by the three-bit output of the thermal asperity event detector. Thus, the gain compensation DAC outputs one of eight analog signals that change the gain of variable gain amplifier 504 by from 0 to +2.1 dB. The correct amount of gain compensation is determined by the ratio of the source resistance 212 to the modified input resistance 240 when a thermal asperity event is detected.

In addition to thermal asperity gain compensation DAC 510, there is a feedback gain DAC 520 that adjusts the gain of the variable gain amplifier based on feedback received from the output of the read channel. Such feedback from the output may be generated by a bit error rate determined by well known gradient equations. Feedback from the read channel output generally is input to feedback gain DAC 520 in the form of a digital gain word 524. The gain feedback calculation is generally frozen during a thermal asperity event because a large disturbance in the data is likely to corrupt such calculations.

The analog output of feedback gain DAC 520 and the analog output of thermal asperity gain compensation DAC 510 are added at a summing junction 522. The output of summing junction 522 is input to variable gain amplifier 504 at a gain control input 505.

Thus, when the thermal asperity event detector detects a thermal asperity event, the input resistance to the read channel amplifier is lowered and at the same time a fixed amount of bias voltage or current is injected to the variable gain amplifier circuit to increase the gain of the read channel amplifier. This open loop adjustment to the gain of the variable gain amplifier is effected while the read channel output feedback loop is frozen. The additional gain is added to the variable gain amplifier to compensate for the gain loss due to the lower input resistance. The net gain variation seen at the output of the variable gain amplifier during a thermal asperity event is thus reduced.

Figure 6:
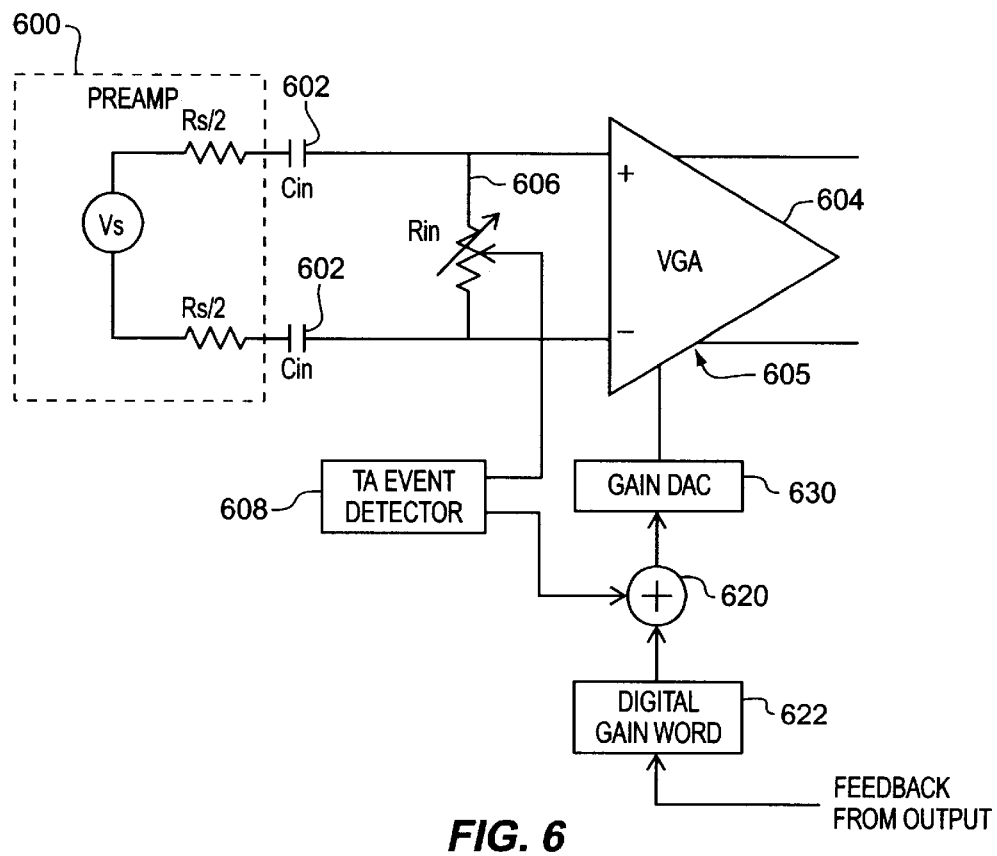
FIG. 6 is a block diagram illustrating a thermal asperity compensation circuit that includes digital gain compensation.

In one embodiment, the gain compensation can also be implemented in the digital domain. FIG. 6 is a block diagram illustrating a thermal asperity compensation circuit that includes digital gain compensation. Gain compensation is represented as a digital word, which is added to the feedback digital gain value during a thermal asperity event. The output of a preamplifier 600 is coupled to a variable gain amplifier 604 that has a gain control input 605 through a pair of coupling capacitors 602. The input resistance of the variable gain amplifier is varied using a variable shunt resistor 606. A thermal asperity event detector 608 controls the resistance of variable shunt resistor 606.

In addition, in one embodiment, thermal asperity event detector 608 also outputs a digital signal that corresponds to the strength of the detected thermal asperity event. In one embodiment, the thermal asperity event detector detects eight levels of thermal asperity events and outputs a three-bit signal, the value of which corresponds to the level of thermal asperity event detected. The different digital outputs of the thermal asperity event detector corresponds to different adjustments the amplifier input resistance that correspond to different adjustments to the gain of the variable gain amplifier. In one embodiment, the eight selected gains vary from 0 to 2.1 dB in 0.3 dB increments. As noted above, in one embodiment, the input resistance and the associated gain change are preselected for a single threshold thermal asperity event detector.

Thus, the thermal asperity event detector selects a gain adjustment that corresponds to the adjustment made to input shunt resistor 606. The digital output of thermal asperity detector 608 is combined with a digital gain word 622 that is determined based on feedback from the output of the read channel. The combination of the two digital signals is made at a combiner 620. The output of combiner 620 is input to a gain DAC 630. Gain DAC 30 converts the digital gain control value into an analog gain control current or voltage that applied to variable gain amplifier 605.

It should be noted that the architecture shown may be varied in some embodiments. For example, the combination of the thermal asperity event detector digital signal and the digital gain word sent back from the output of the read channel may be made within gain DAC 630 instead of occurring at a separate combiner. In addition, thermal asperity event detector 608 may output a digital value that may be combined with digital gain word 622 or thermal asperity event detector 608 may output a value that is converted by a separate functional block.

Thus, the system shown in FIG. 6 combines a signal from a thermal asperity event detector with a digital gain word derived from feedback from the output signal of the read channel. Just as for the system described in FIG. 5, a fixed amount of bias voltage or current is injected into the variable gain amplifier circuit to increase the gain and compensate for the lowered input resistance of the amplifier while the main gain feedback loop is frozen.

Figure 7:
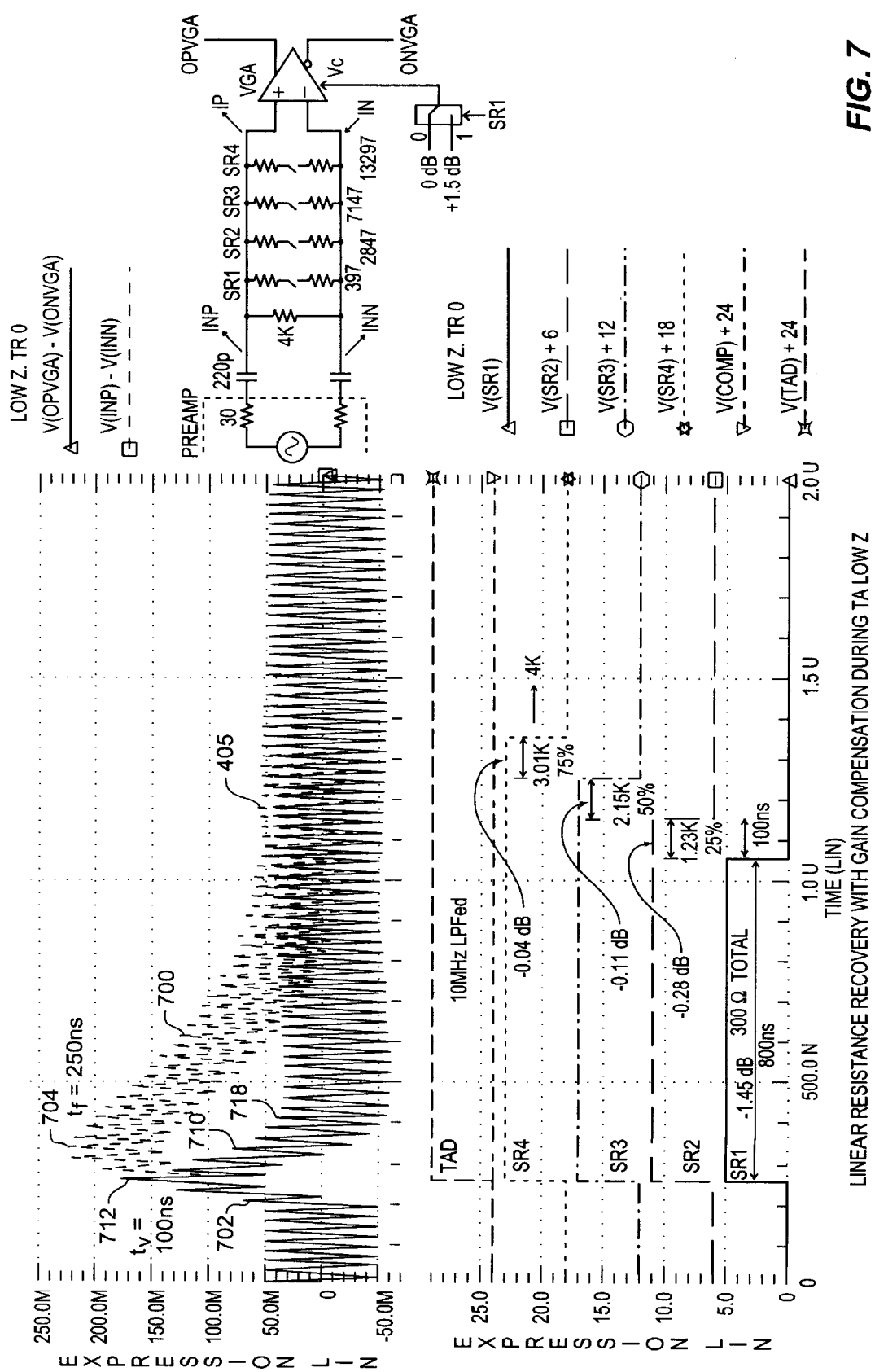
FIG. 7 is a graph illustrating the output signal from a read channel amplifier during the occurrence of a thermal asperity event.

FIG. 7 is a graph illustrating the output signal from a read channel amplifier during the occurrence of a thermal asperity event. Plot 700 was generated for a thermal asperity event without input resistance compensation. The thermal asperity event occurs at 702. The voltage peaks at a point 704, and the output of the amplifier does not return to the allowed range until about point 708. A trace 710 illustrates the effect of compensating for the thermal asperity event by changing the input resistance to the amplifier. The voltage peak following the thermal asperity event occurs at a point 712.

The signal has returned to an acceptable range by about point 718.

In addition, plot 710 was generated using gain compensation as described above.

Comparing FIG. 7 to FIG. 4, it can be seen that the amplitude of signal 710 following the thermal asperity event is not attenuated as the amplitude of signal 410 is. Thus, it can be seen that the gain compensation scheme described above allows the effect of a thermal asperity event to be mitigated by lowering the input resistance of the read channel amplifier without undesirably decreasing the amplitude of the read signal and causing information to be either lost or misread.

A system and method for compensating for a thermal asperity event has been disclosed. A thermal asperity event is compensated for by reducing the input resistance of a variable gain amplifier in the read channel. In addition, the thermal asperity event detector provides a gain compensation signal that is used to adjust the gain of the variable gain amplifier.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of reading data from a magnetic disk comprising:

generating a preamplified data signal by reading the magnetic state of the disk using a magnetoresistive head;

capacitively coupling the preamplified data signal to a variable gain read channel amplifier, the variable gain read channel amplifier having an input, an output, and a programmable gain, wherein the input of the variable gain read channel amplifier has a variable gain read channel amplifier input resistance;

detecting the occurrence of a thermal asperity event;

making an adjustment to the variable gain read channel amplifier input resistance to compensate for the thermal asperity event;

making an adjustment to the programmable gain of the variable gain read channel amplifier to compensate for the adjustment to the variable gain read channel amplifier input resistance.

2. A method of adjusting the gain of a variable gain read channel amplifier having an input, an output and a programmable gain upon the occurrence of a thermal asperity event comprising:

detecting a thermal asperity event;

changing the resistance across the inputs of the variable gain read channel amplifier to allow energy generated by the thermal asperity event to dissipate wherein said change in the resistance across the inputs of the variable gain read channel amplifier causes an attenuation in the output of the variable gain read channel amplifier;

generating a thermal asperity gain adjustment signal for the variable gain read channel amplifier, the gain adjustment signal corresponding to a change in gain of the variable gain read channel amplifier that compensates for the attenuation in the output of the variable gain read channel amplifier; and changing the programmable gain of the variable gain read channel amplifier using the thermal asperity gain adjustment signal.

3. A method of adjusting the gain of a variable gain read channel amplifier as recited in claim 2 wherein changing the programmable gain of the variable gain read channel amplifier using the thermal asperity gain adjustment signal is made without feedback from the variable gain read channel amplifier output.

4. A method of adjusting the gain of a variable gain read channel amplifier as recited in claim 2 wherein changing the programmable gain of the variable gain read channel amplifier using the gain adjustment signal includes combining the thermal asperity gain adjustment signal with a feedback gain adjustment signal.

5. A method of adjusting the gain of a variable gain read channel amplifier as recited in claim 4 wherein the thermal asperity gain adjustment signal changes during a period of time that the feedback gain adjustment signal does not change.

6. A method of adjusting the gain of a variable gain read channel amplifier as recited in claim 2 wherein the thermal asperity event detected is one of a plurality of possible thermal asperity events wherein each of the plurality of possible thermal asperity events corresponds to a different change in resistance across the inputs of the variable gain read channel amplifier.

7. A method of adjusting the gain of a variable gain read channel amplifier as recited in claim 6 wherein the thermal asperity gain adjustment signal is generated based on which possible thermal asperity event is detected.

8. A method of adjusting the gain of a variable gain read channel amplifier as recited in claim 6 wherein the plurality of possible thermal asperity events consists of 8 levels of thermal asperity events and each level of thermal asperity event corresponds to a different possible thermal asperity gain adjustment signal.

9. A method of adjusting the gain of a variable gain read channel amplifier as recited in claim 8 different possible thermal asperity gain adjustment signals adjust the gain of the variable gain read channel amplifier by between about 0 dB and about 2 dB.

10. A method of adjusting the gain of a variable gain read channel amplifier as recited in claim 8 different possible thermal asperity gain adjustment signals adjust the gain of the variable gain read channel amplifier by between about 0 dB and about 2 dB in about 0.3 dB increments.

11. A method of adjusting the gain of a variable gain read channel amplifier as recited in claim 6 wherein generating a thermal asperity gain adjustment signal for the variable gain read channel amplifier includes selecting a selected thermal asperity gain adjustment signal that corresponds to a selected change in resistance across the inputs of the variable gain read channel amplifier.

12. A system for reading data from a magnetic disk comprising:

a magnetoresistive recording head;

a preamplifier circuit that generates a sense signal from the magnetoresistive recording head;

a variable gain read channel amplifier having a variable gain control input and having differential inputs;

a capacitive coupling circuit that connects the preamplifier circuit to the variable gain read channel amplifier;

a variable resistor across said differential inputs of said variable gain read channel amplifier;

a thermal asperity event detector coupled to a variable gain control input of said variable gain read channel amplifier and coupled to said variable resistor, that detects thermal asperity events by sensing signal values on said differential inputs of said variable gain read channel amplifier and sends a gain adjustment signal to the variable gain read channel amplifier upon the occurrence of such an event and sends a corresponding resistance adjustment signal to the variable resistor upon the occurrence of such an event.

13. The system of claim 12 wherein said thermal asperity event detector includes:

a plurality of thermal asperity event level detectors wherein each level detector of said plurality of thermal asperity level detectors detects a particular level of thermal asperity.

14. The system of claim 13 wherein said thermal asperity event detector further includes:

a plurality of resistance adjustors corresponding to said plurality of thermal asperity level detectors wherein each resistance adjustor of said plurality of resistance adjustors adjusts said variable resistor in accordance with the particular level of thermal asperity detected by a corresponding level detector.

15. The system of claim 13 wherein said thermal asperity event detector further includes:

a plurality of gain adjustors corresponding to said plurality of thermal asperity level detectors wherein each gain adjustor of said plurality of gain adjustors adjusts said variable gain read channel amplifier in accordance with the particular level of thermal asperity detected by a corresponding level detector.

* * * * *